United States Patent [19]

Trout et al.

[11] 4,070,487

[45] Jan. 24, 1978

[54] METHOD OF STIMULATING APPETITE IN RUMINANTS AND RUMINANT FEED CONTAINING APPETITE STIMULANT

[75] Inventors: Glenn A. Trout, Lebanon; Barry L. Zoumas; Stanley M. Tarka, both of Palmyra, all of Pa.

[73] Assignee: Hershey Foods Corporation, Hershey, Pa.

[21] Appl. No.: 711,912

[22] Filed: Aug. 5, 1976

[51] Int. Cl.² ............................................... A23L 1/00
[52] U.S. Cl. ...................................... 426/2; 426/630; 426/631; 426/807
[58] Field of Search ................... 426/2, 623, 630, 631, 426/635, 807, 805

[56] References Cited

U.S. PATENT DOCUMENTS 3,809,778   5/1974   Drevici et al. ...................... 426/481

OTHER PUBLICATIONS

Weaver et al., "Rat Growth Promotion With Theobromine and Cocoa", Chemical Abstract, vol. 83 : 112754u, 1975.
Monison, "Feeds and Feeding", Morrison Publishers, 22nd Edition, 1956, p. 499.

*Primary Examiner*—R. B. Penland
*Attorney, Agent, or Firm*—Seidel, Gonda & Goldhammer

[57] ABSTRACT

The method of stimulating appetite in ruminants by including in their diet between about 0.05 to 0.1 weight percent of theobromine, or an amount of cocoa solids, cocoa shells or cocoa pods containing such weight percentage of theobromine, and a ruminant feed containing between about 0.05 to 0.1 weight percent of theobromine (which may be pure theobromine or theobromine derived from cocoa solids, cocoa shells and/or cocoa pods).

8 Claims, No Drawings

METHOD OF STIMULATING APPETITE IN RUMINANTS AND RUMINANT FEED CONTAINING APPETITE STIMULANT

The present invention is directed to a method of stimulating appetite in ruminants, and more particularly to a method whereby ruminants may be brought to desired weight levels more rapidly and a ruminant feed containing an appetite stimulant.

STATE OF THE ART

In the past, there have been numerous suggestions to use cocoa shells and/or cocoa pods in cattle feed. See, for example, British Pat. No. 1838 of 1881; British Pat. No. 6,774 of 1913; British Pat. No. 10328 of 1914; French Pat. No. 555,249; and U.S. Pat. No. 2,458,680.

However, feeds for ruminants, such as cattle and sheep containing cocoa solids, cocoa shells and/or cocoa pods have not met with widespread adoption. The reason for this is probably due to statements in the literature such as that contained in "FEEDS AND FEEDING", by Frank B. Morrison, 22nd Edition (The Morrison Publishing Company) 1956, p. 499:

"Woodman of England advises that cocoa shells be fed only to mature cattle and in amounts no greater than 2 lbs. per head daily, because cocoa shells contain small amounts of the alkaloids which make cocoa meal dangerous. He concludes that cocoa shells when thus fed have no higher feeding value per pound than a good roughage."

Cocoa shells are relatively rich in the alkaloid theobromine and contain on the order of about 1.0 to 1.25 weight percent theobromine. Cocoa pods contain on average about 0.2 to 0.25 weight percent theobromine. Cocoa solids contain an average about 2 to 2.5 weight percent theobromine.

The effect of theobromine and of cocoa shells varies from species from species. By way of example, experiments with chickens demonstrates that even small amounts of theobromine give a negative growth rate response. Experiments with rats have been reported in the article: Rat Growth Promotion With Theobromine And Cocoa, by John C. Weaver et al., Lebenmsme Wiss U. Technol. 8, pp. 57–59 (1975). Weaver found a marked variance in growth promoting response in rats between theobromine and cocoa, with the former having a relatively better growth response. Zoumas and Tarka, Fed. Proc. 35(3): p. 341 (1976) demonstrated an increased weight gain in rats accompanied by a significant increase in food intake in animals receiving between 0.08–0.10 weight percent theobromine.

As an economic matter, the confection industry produces large amounts of cocoa shells and cocoa pods as a by-product. At the present time, cocoa shells and cocoa pods have an economic value far below that of normal feed for ruminants. Moreover, their economic value is far below that of pure theobromine.

OBJECTS

This invention has as an object the provision of a method of stimulating the appetite of ruminants, and in particular lambs.

Another object of the present invention is the provision of nutritionally beneficial feeds for ruminants in which a portion of the feed consists of the relatively low cost cocoa shell and/or cocoa pod by-products from the confection industry.

A still further object of the present invention is the provision of a ruminant feed containing an appetite stimulant.

DESCRIPTION OF THE INVENTION

These and other objects are achieved by the method of the present invention in which we have determined that the appetite of adult and young ruminants, such as lambs, or calves, may be stimulated by the inclusion in their diet of 0.05 to 0.1 weight percent theobromine. Of great commercial interest, we have determined that the theobromine need not be pure theobromine, but may be administered in the ruminant feed as cocoa solids, cocoa shells and/or cocoa pods. By controlling the amount of cocoa solids, cocoa shells and/or cocoa pods so that theobromine concentration of the feed is between 0.05 to 0.1 weight percent, the adverse effects, if any, of the other constituents of cocoa solids, cocoa shells and/or cocoa pods reported in the literature are avoided.

The ruminant feed containing an appetite stimulant constitutes a conventional ruminant feed in which there is present between 0.05 to 0.1 weight percent of theobromine. Such theobromine may be present either as pure theobromine or in an equivalent amount from cocoa solids, cocoa shells or from cocoa pods or from a mixture of two or more of cocoa solids, cocoa shells and cocoa pods.

Our work indicates that when the concentration is controlled between the limits of about 0.05 to 0.1 weight percent theobromine, there is a definite stimulation of appetite in ruminants, and, in particular, in young ruminants such as lambs and calves.

This stimulation of appetite is commercially significant, since it enables a given weight level to be achieved in a shorter period of time, so that the animals may be brought to market sooner than otherwise. Thus, the animals eat more than their metabolic needs. Since their weight gain is substantially directly proportional to their feed intake, a desired degree of weight gain is achieved in a shorter time.

It is also possible that there is an increase in efficiency namely that the animals achieve a higher weight gain from a given amount of food when the method of the present invention is practiced. However, this increase in food efficiency has not been adequately demonstrated statistically.

We have found that the weight percentage of theobromine in ruminant feeds must be closely controlled to achieve the desired appetite stimulation. Thus, at a concentration below about 0.05 weight percent, there is no beneficial effects derived from the inclusion of theobromine in the ruminant feed diet, while at a concentration above about 0.1 weight percent theobromine, there is a marked decrease in appetite.

The effect of theobromine on ruminants when administered in the concentrations of 0.05 to 0.1 weight percent is that of appetite stimulator, and not of a growth promoter, although there may possibly be some small increase in efficiency of food utilization. Of vital significance commercially is that ruminants may use cocoa solids, cocoa shells and/or cocoa pods as the theobromine source, and in particular, cocoa shells and/or cocoa pods without the need for extraction and purification of the theobromine.

EXAMPLE

Ninety male unshorn lambs weighing approximately 50 pounds each, and being approximately six months of age were utilized. The population was made up of a total of eight different crossbreeds of sheep. The animals were sheared to removed any ectoparasites and dewormed. They were also weighed, so that their nutritutional status could be monitored.

In the interim, all animals were fed ad libitum a high concentrate (60:40) of hay to corn pelleted ration of similar consistency to the study's control ration.

The animals were randomized into ten groups of nine lambs per group, and each group was allocated to one of the experimental diets of the composition found in Table 1.

on an isonitrogenous basis, namely an equal amount of protein in each of the rations.

There is shown in Table 3 the chemical composition of the rations used in the study expressed on a dry matter basis in weight percent, with the cocoa shell diets being formulated to provide 50, 100, 150 and 200 milligrams of theobromine per 100 grams of diet. Parenthetically, the crude protein values for the theobromine and cocoa shell diets set forth in Table 3 are higher than the control values due to the nitrogen from the theobromine.

Table 3

| No. | Ration | Crude Protein % | Crude Fat % | Crude Fiber % | Ash % | N-Free Extract % |
|---|---|---|---|---|---|---|
| (1) | Control | 10.7 | 2.8 | 11.8 | 4.1 | 70.6 |
| (2) | Control + 50 mg/100 gm diet Theobromine | 11.6 | 2.5 | 11.6 | 4.6 | 69.7 |
| (3) | Control + 100 mg/100 gm diet Theobromine | 11.4 | 2.9 | 11.6 | 4.6 | 69.5 |
| (4) | Control + 150 mg/100 gm diet Theobromine | 11.2 | 2.8 | 11.6 | 4.3 | 70.1 |
| (5) | Control + 200 mg/100 gm diet Theobromine | 11.4 | 3.0 | 11.9 | 4.4 | 69.3 |
| (6) | Control | 10.7 | 2.8 | 11.8 | 4.1 | 70.6 |
| (7) | 4.63% Cocoa Shell | 11.4 | 2.9 | 10.7 | 5.0 | 70.0 |
| (8) | 9.25% Cocoa Shell | 12.6 | 3.0 | 12.0 | 4.7 | 67.7 |
| (9) | 13.87% Cocoa Shell | 13.0 | 2.9 | 11.1 | 4.7 | 68.3 |
| (10) | 18.50% Cocoa Shell | 12.8 | 2.8 | 10.3 | 4.7 | 69.4 |

Table 1.

Table 1

(Part A)

| | | | | Ration (Weight Percent) | |
|---|---|---|---|---|---|
| Ingredient | (1) Control | (2) 50 mg Theobromine | (3) 100 mg Theobromine | (4) 150 mg Theobromine | (5) 200 mg Theobromine |
| Hay | 43.13 | 43.13 | 43.13 | 43.13 | 43.3 |
| Corn | 55.00 | 55.00 | 55.00 | 55.00 | 55.00 |
| Soybean Meal | 0.87 | 0.87 | 0.87 | 0.87 | 0.87 |
| Vitamin Premix Whitmoyer No. 6 | 0.25 | 0.25 | 0.25 | 0.25 | 0.25 |
| Trace Mineral Mix Whitmoyer No. 2 | 0.05 | 0.05 | 0.05 | 0.05 | 0.05 |
| Chlorotetracycline | 0.02 | 0.02 | 0.02 | 0.02 | 0.02 |
| Dicalcium Phosphate | 0.68 | 0.63 | 0.58 | 0.53 | 0.48 |
| Cocoa Shells | — | — | — | — | — |
| Theobromine | — | 0.05 | 0.10 | 0.15 | 0.20 |
| TOTAL % | 100.00 | 100.00 | 100.00 | 100.00 | 100.00 |

(Part B)

| | | | | Ration (Weight Percent) | |
|---|---|---|---|---|---|
| Ingredient | (6) Control | (7) 4.6% Cocoa Shell | (8) 9.2% Cocoa Shell | (9) 13.8% Cocoa Shell | (10) 18.5% Cocoa Shell |
| Hay | 43.13 | 40.50 | 35.75 | 27.00 | 22.00 |
| Corn | 55.00 | 52.25 | 51.35 | 53.93 | 53.24 |
| Soybean Meal | 0.87 | 1.62 | 2.65 | 4.20 | 5.26 |
| Vitamin Premix Whitmoyer No. 6 | 0.25 | 0.25 | 0.25 | 0.25 | 0.25 |
| Trace Mineral Mix Whitmoyer No. 2 | 0.05 | 0.05 | 0.05 | 0.05 | 0.05 |
| Chlorotetracycline | 0.02 | 0.02 | 0.02 | 0.02 | 0.02 |
| Dicalcium Phosphate | 0.68 | 0.68 | 0.68 | 0.68 | 0.68 |
| Cocoa Shells | — | 4.63 | 9.25 | 13.87 | 18.50 |
| Theobromine | — | — | — | — | — |
| TOTAL % | 100.00 | 100.00 | 100.00 | 100.00 | 100.00 |

The composition of the major ingredients used in the study are set forth below in Table 2 with the cocoa shell analyses being reported on an as-is basis, and the corn and hay data being expressed on a dry matter basis. All analyses are reported in weight percent.

Table 2

| Component | Theobromine % | Caffeine % | Moisture % | Crude Protein % | Crude Fat % | Ash % | Crude Fiber % |
|---|---|---|---|---|---|---|---|
| Cocoa Shell | 0.99 | 0.15 | 1.6 | 16.4 | 3.5 | 8.6 | 19.8 |
| Corn | — | — | — | 8.4 | 3.8 | 2.2 | 1.2 |
| Hay | — | — | — | 15.6 | 1.7 | 8.7 | 32.0 |

The rations were formulated on an isocaloric basis, namely equal caloric values in each of the rations, and a block of Diamond Crystal Trace Mineralized salt available to the animals on an ad libitum basis throughout the ninety day period.

The food consumption data for each of the ten groups of nine lambs is set forth in Table 4 for the fourteen weeks comprising the study:

Table 4

Daily Food Consumption of Lambs (Pounds/Group)
Ration

| Week No. | 1 | 2 | 3 | 4 | 5 | 6 | 7 | 8 | 9 | 10 |
|---|---|---|---|---|---|---|---|---|---|---|
| 1 | 23.4 | 22.7 | 22.5 | 22.9 | 22.5 | 22.6 | 22.5 | 22.6 | 22.1 | 20.8 |
| 2 | 25.1 | 24.5 | 25.1 | 23.7 | 24.9 | 25.1 | 25.2 | 25.1 | 24.2 | 23.8 |
| 3 | 26.2 | 26.2 | 25.8 | 26.1 | 26.2 | 26.2 | 26.2 | 24.8 | 25.0 |
| 4 | 28.0 | 28.0 | 27.8 | 27.1 | 26.1 | 27.9 | 28.0 | 28.0 | 27.0 | 24.7 |
| 5 | 28.0 | 28.0 | 28.0 | 25.4 | 25.6 | 28.0 | 27.6 | 28.0 | 24.9 | 25.2 |
| 6 | 28.0 | 28.0 | 28.0 | 26.6 | 24.6 | 27.7 | 28.0 | 28.0 | 26.8 | 26.4 |
| 7 | 28.2 | 28.2 | 28.2 | 28.2 | 28.2 | 28.0 | 28.2 | 28.2 | 28.1 | 28.1 |
| 8 | 32.6 | 32.6 | 32.6 | 32.4 | 29.7 | 32.3 | 32.4 | 32.6 | 30.9 | 30.1 |
| 9 | 33.6 | 34.0 | 33.7 | 30.1 | 29.5 | 33.1 | 33.7 | 34.0 | 29.5 | 30.2 |
| 10 | 33.4 | 34.0 | 32.6 | 29.4 | 29.6 | 33.3 | 33.9 | 34.0 | 31.1 | 30.2 |
| 11 | 33.1 | 34.0 | 34.0 | 31.2 | 31.2 | 32.4 | 33.3 | 33.9 | 32.0 | 31.4 |
| 12 | 33.7 | 34.0 | 34.0 | 31.6 | 30.4 | 32.4 | 34.0 | 34.0 | 31.1 | 31.4 |
| 13 | 34.0 | 36.0 | 35.7 | 30.1 | 31.0 | 31.1 | 35.6 | 36.0 | 33.6 | 32.1 |
| 14 | 33.4 | 37.6 | 37.7 | 32.8 | 33.0 | 32.6 | 37.9 | 38.0 | 33.7 | 33.0 |

The animals were weighed on a bi-weekly basis. Tables 5 and 6 provide the mean biological data on a biweekly basis for groups 1-5 and 6-10, respectively. In Tables 5 and 6, the weight gain is reported in pounds. The designation "FI." means feed intake per day in pounds. Feed Efficiency is the weight gain divided by the food intake, namely the amount of weight gain derived from a pound of feed.

TABLE 5

Cumulative Mean Biological Data
(Biweekly) Groups 1-5

| Diet | Initial Wt. | Weeks | | | | | | |
|---|---|---|---|---|---|---|---|---|
| | | 2 | 4 | 6 | 8 | 10 | 12 | 14 |
| (1) Control | 61.5 | | | | | | | |
| Total Avg. Wt. Gain | | 8.83 | 14.11 | 23.11 | 30.17 | 40.11 | 47.50 | 55.20 |
| Total Avg. F.I. | | 2.69 | 2.86 | 2.94 | 3.05 | 3.19 | 3.27 | 3.34 |
| Feed Efficiency | | 0.23 | 0.17 | 0.18 | 0.18 | 0.18 | 0.17 | 0.16 |
| (2) 50 mg/100 gm diet Theobromine | 61.7 | | | | | | | |
| Total Avg. Wt. Gain | | 8.27 | 18.00 | 25.06 | 32.38 | 40.11 | 48.70 | 56.80 |
| Total Avg. F.I. | | 2.62 | 2.82 | 2.91 | 3.03 | 3.18 | 3.27 | 3.40 |
| Feed Efficiency | | 0.22 | 0.22 | 0.20 | 0.19 | 0.18 | 0.18 | 0.17 |
| (3) 100 mg/100 gm diet Theobromine | 61.6 | | | | | | | |
| Total Avg. Wt. Gain | | 10.94 | 16.94 | 25.16 | 32.06 | 41.33 | 48.70 | 56.60 |
| Total Avg. F.I. | | 2.64 | 2.82 | 2.92 | 3.04 | 3.17 | 3.27 | 3.40 |
| Feed Efficiency | | 0.29 | 0.21 | 0.21 | 0.19 | 0.18 | 0.18 | 0.17 |
| (4) 150 mg/100 gm diet Theobromine | 61.6 | | | | | | | |
| Total Avg. Wt. Gain | | 6.25 | 13.37 | 21.64 | 25.22 | 33.43 | 39.00 | 43.50 |
| Total Avg. F.I. | | 2.59 | 2.76 | 2.80 | 2.95 | 3.02 | 3.10 | 3.20 |
| Feed Efficiency | | 0.16 | 0.17 | 0.18 | 0.15 | 0.16 | 0.14 | 0.14 |
| (5) 200 mg/100 gm diet Theobromine | 61.6 | | | | | | | |
| Total Avg. Wt. Gain | | 8.11 | 13.05 | 19.88 | 25.44 | 31.77 | 38.70 | 46.20 |
| Total Avg. F.I. | | 2.63 | 2.77 | 2.77 | 2.87 | 2.96 | 3.04 | 3.10 |
| Feed Efficiency | | 0.22 | 0.16 | 0.16 | 0.16 | 0.15 | 0.15 | 0.15 |

TABLE 6

Cumulative Mean Biological Data
(Biweekly) Groups 6-10

| Diet | Initial Wt. | Weeks | | | | | | |
|---|---|---|---|---|---|---|---|---|
| | | 2 | 4 | 6 | 8 | 10 | 12 | 14 |
| (6) Control | 61.5 | | | | | | | |
| Total Avg. Wt. Gain | | 9.05 | 14.55 | 23.44 | 31.00 | 41.28 | 44.60 | 55.60 |
| Total Avg. F.I. | | 2.65 | 2.83 | 2.92 | 3.03 | 3.16 | 3.21 | 3.30 |
| Feed Efficiency | | 0.24 | 0.18 | 0.19 | 0.18 | 0.18 | 0.17 | 0.17 |
| (7) 4.63% Cocoa Shell | 61.3 | | | | | | | |
| Total Avg. Wt. Gain | | 8.72 | 16.88 | 25.83 | 32.33 | 41.11 | 48.20 | 56.20 |
| Total Avg. F.I. | | 2.64 | 2.83 | 2.91 | 3.03 | 3.18 | 3.27 | 3.40 |
| Feed Efficiency | | 0.23 | 0.21 | 0.21 | 0.19 | 0.18 | 0.17 | 0.16 |
| (8) 9.25% Cocoa Shell | 61.7 | | | | | | | |
| Total Avg. Wt. Gain | | 9.37 | 16.61 | 27.22 | 32.11 | 41.78 | 49.70 | 58.00 |
| Total Avg. F.I. | | 2.65 | 2.83 | 2.92 | 3.04 | 3.19 | 3.28 | 3.40 |
| Feed Efficiency | | 0.24 | 0.21 | 0.22 | 0.18 | 0.18 | 0.18 | 0.17 |
| (9) 13.87% Cocoa Shell | 61.8 | | | | | | | |
| Total Avg. Wt. Gain | | 7.06 | 11.68 | 20.66 | 25.72 | 34.89 | 44.80 | 49.50 |
| Total Avg. F.I. | | 2.57 | 2.72 | 2.78 | 2.90 | 3.00 | 3.08 | 3.20 |
| Feed Efficiency | | 0.19 | 0.15 | 0.18 | 0.16 | 0.16 | 0.17 | 0.16 |
| (10) 18.50% Cocoa Shell | 61.6 | | | | | | | |
| Total Avg. Wt. Gain | | 7.93 | 12.28 | 24.00 | 26.22 | 36.71 | 45.40 | 48.60 |
| Total Avg. F.I. | | 2.48 | 2.62 | 2.63 | 2.78 | 2.90 | 3.00 | 3.10 |
| Feed Efficiency | | 0.22 | 0.16 | 0.22 | 0.17 | 0.18 | 0.18 | 0.16 |

It is manifest that groups 2 and 3, and 7 and 8 (0.05 and 0.1 weight percent theobromine and 4.63 and 9.25 weight percent cocoa shell) reveal a dramatic increase in feed consumption from the control. These groups were consuming between 4 and 5 pounds per day more ration. Moreover, with these groups, the effect on food consumption was evident by four weeks. With higher concentrations of theobromine and cocoa shell, there is a severe decrease of food intake.

It is also manifest from our data that the cocoa shell is the full equivalent of pure theobromine in terms of efficacy. Indeed, rations may be formulated using the relatively low cost cocoa shell by-product up to a concentration of about 10 weight percent of cocoa shell.

It is also apparent from the foregoing data that with ruminants at the concentrations here-present, neither pure theobromine nor cocoa shell possesses a growth stimulating activity to any considerable degree since there is no net improvement in feed efficiency ratios.

The present invention may be embodied in other specific forms without departing from the spirit or essential attributes thereof and, accordingly, reference should be made to the appended claims, rather than to the foregoing specification as indicating the scope of the invention.

We claim:

1. A method of stimulating appetite in a ruminant comprising administering theobromine to the ruminant in a weight concentration of between about 0.05 to 0.1 weight percent theobromine in the ruminant's daily feed.

2. A method of stimulating appetite in accordance with claim 1 in which the theobromine given to the ruminant is pure theobromine.

3. A method of stimulating appetite in accordance with claim 1 in which the theobromine given to the ruminant is present in a substance selected from the group consisting of cocoa solids, cocoa shell, cocoa pods and mixtures of the foregoing.

4. A method of stimulating appetite in a ruminant in accordance with claim 1 in which the ruminant is a lamb.

5. A method of stimulating appetite in a ruminant in accordance with claim 1 in which the ruminant is a calf.

6. In a feed for ruminants the improvement comprising the presence of theobromine as an appetite stimulant in a weight concentration of between about 0.05 to 0.1 weight percent theobromine.

7. A feed for ruminants in accordance with claim 6 in which the theobromine is pure theobromine.

8. A feed for ruminants in accordance with claim 6 in which the theobromine is present in a member selected from the group consisting of cocoa solids, cocoa shell, cocoa pods and mixtures of the foregoing.

* * * * *